United States Patent [19]
Hopper

[11] Patent Number: 6,123,645
[45] Date of Patent: Sep. 26, 2000

[54] NEUTRAL IDLE CONTROL MECHANISM FOR A TORQUE-TRANSMITTING CLUTCH IN A POWER TRANSMISSION

[75] Inventor: Mark L. Hopper, Ypsilanti, Mich.

[73] Assignee: General Motors Corporation, Detroit, Mich.

[21] Appl. No.: 09/323,410

[22] Filed: Jun. 1, 1999

[51] Int. Cl.[7] .................................................. B60K 41/06
[52] U.S. Cl. ........................ 477/164; 477/114; 477/121; 137/112; 91/447
[58] Field of Search .................. 477/93, 94, 95, 477/114, 156, 164; 137/112; 91/447

[56] References Cited

U.S. PATENT DOCUMENTS

| | | | |
|---|---|---|---|
| 4,476,745 | 10/1984 | Moan | 477/155 X |
| 4,603,604 | 8/1986 | Nishikawa et al. | 477/114 X |
| 4,660,442 | 4/1987 | Nishikawa et al. | 477/114 X |
| 4,686,872 | 8/1987 | Aoki et al. | 477/114 |
| 4,840,092 | 6/1989 | Sakaguchi et al. | 477/114 X |
| 4,850,251 | 7/1989 | Kuwayama et al. | 477/114 |

*Primary Examiner*—Rodney H. Bonck
*Assistant Examiner*—Ankur Parekh
*Attorney, Agent, or Firm*—Dean L. Ellis; Michael J. Bridges

[57] ABSTRACT

A control for a power transmission has a neutral idle circuit comprised of a signal valve, a control valve and a shuttle valve. The signal valve supplies a bias pressure to the control valve, which has an output control pressure proportional to the input torque to the transmission. The output control pressure and transmission line pressure act on the shuttle valve to direct the control pressure to a clutch in the transmission when the output pressure is below a predetermined percentage of the transmission line pressure and to direct line pressure to the clutch when the predetermined percentage is exceeded. This permits the clutch to be controlled at or below a slipping engagement state.

2 Claims, 3 Drawing Sheets

NEUTRAL IDLE CONTROL MECHANISM FOR A TORQUE-TRANSMITTING CLUTCH IN A POWER TRANSMISSION

TECHNICAL FIELD

This invention relates to power transmission control mechanisms and particularly to control mechanisms for reducing the torque transmitting capability of a fluid operated friction torque transmitter during an idle condition.

BACKGROUND OF THE INVENTION

When a vehicle is at rest with the engine operating and the transmission in forward drive, it is desirable to release a fluid operated friction device in the transmission to a slipping condition. In this condition, the friction device transmits minimum torque such that the torque converter is not required to operate in a stall condition. These systems increase the overall efficiency of the powertrain by improving fuel economy. This condition has been denoted as neutral idle. It is important that neutral idle be transparent to the operator by minimizing the disturbance associated with the re-engagement of the friction device. In many prior art devices, the fill time of the apply clutch of the friction device cause an undesirable shift disturbance in the transmission.

Other prior art systems use an automatic neutral control wherein the forward clutch is released when the throttle is released, the brakes applied and the vehicle is at rest. These controls then automatically shift back to drive when the vehicle brake is released. These systems fully release the torque converter turbine from the planetary gear set and in doing so, improve the vehicle fuel economy. However, the clutch fill time associated with these devices and the ability of the operator to increase the input torque with throttle advance can result in an undesirable shift quality and heat generation in the clutch.

Auto neutral control have generally en compass ed one of the following control methods:

1. The partial fill method which tries to keep the clutch apply chamber filled without enforcing clutch disc contact. This is usually accomplished by con trolling the clutch apply pressure through three successive ramps followed by holding the clutch pressure at a constant level. While this method reduces clutch fill time, it produces inconsistent clutch apply times due to the variable holding pressure and leakage at the clutch piston.

2. The torque converter slip method which maintains the clutch filled by controlling the torque converter slip at a very low level. An advantage of this method is substantially constant fill time. A disadvantage is the possibility of heat generation at the clutch during long periods of continuous slip.

3. The intermittent slip method described in U.S. Pat. No. 5,803,869 issued to Jamzadeh et al on Sep. 8, 1998. This method continuously engages the friction device to a torque level less than full engagement and then disengages the friction device to a non-slip condition such that the friction alternately slips and runs free. While this method appears to be very effective, a significant amount of computer programming is required for its operation.

SUMMARY OF THE INVENTION

It is an object of the present invention to provide an improved neutral idle control for a selectively engageable friction device in a power transmission.

In one aspect of the present invention, a fluid operated friction device is controlled by a first pressure source during a low torque range and a second pressure source during a high torque range. In another aspect of the present invention, the first pressure source is derived from the second pressure source.

In yet another aspect of the present invention, the first pressure source is a percentage of the second pressure source. In still another aspect of the present invention, a valve responsive to the first and second pressure sources is operable to direct the proper source to the friction device.

DESCRIPTION OF AN EXEMPLARY EMBODIMENT

Figure 1:
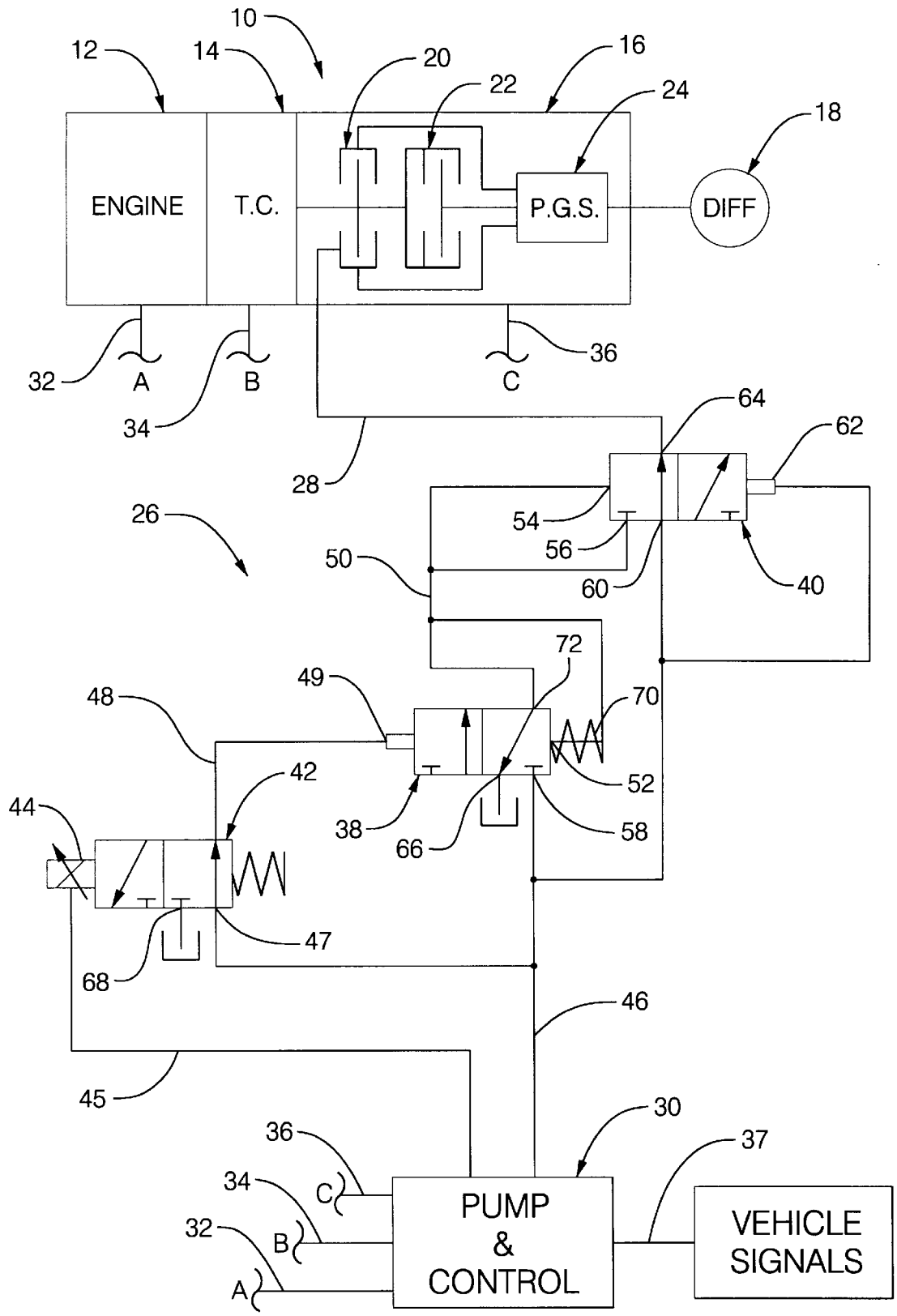
FIG. 1 is a diagrammatic view of a portion of a powertrain and a portion of a transmission control incorporating the present invention.

A powertrain, generally designated 10, includes an engine 12, a torque converter 14, a transmission 16 and a differential 18. The transmission 16 is comprised of a plurality of conventional selectively fluid operated friction devices such as clutches 20 and 22 and a conventional planetary gear set 24. The planetary gear arrangement 24 may be constructed in accordance with many of the planetary gears arrangements used in the power transmission art; for example, the planetary gear arrangement 24 may be similar to those described in the following U.S. Pat. Nos.: 4,223,569 issued to Koivunen et al on Sep. 23, 1980; or 4,237,749 issued to Koivunen on Dec. 9, 1980; or 4,418,587 issued to Borman on Apr. 3, 1983; or 4,086,827 issued to Chana on May 2, 1978, all of which are assigned to the assignee of this application. Many other planetary gear arrangements are also possible candidates for use with the present invention.

A control system, generally designated 26, has a passage 28 which communicates with the clutch 20. For purposes of this disclosure, it will be presumed that the clutch 20 is engaged for at least the lowest forward ratio in the planetary gear arrangement 24. The control system 26 also includes a control mechanism 30 which is comprised of a conventional positive displacement pump, an electronic control unit (ECU) and hydraulic valves, not shown. These apparatus are well known in the transmission art. The electronic control unit will include a preprogrammed digital computer which will provide signals to the engine 12 and transmission 16 and the hydraulic valves. The control mechanism 30 receives data, such as throttle condition and speed, from and transmits instructions to the engine 12 through a cable 32. The control mechanism 30 receives data, such as the current drive ratio engaged, transmission input and output speeds and temperature, from and transmits instructions, such as shift timing, to transmission 16 through a cable 34. The control mechanism also receives data from the torque converter 14 through a cable 36 and data, such as brake actuation, from the vehicle through a cable 37. These data are used by the ECU to establish the desired operating conditions for a vehicle in which the powertrain 10 is employed.

The control system 26 also includes a control valve 38, a shuttle valve 40 and a signal valve 42 having a pulse width modulated (pvm) solenoid control valve 44 operating as a pilot valve. The signal valve 42 and the pwm solenoid control valve 44 are preferably combined in a single valve. The pwm solenoid valve 44 receives control data from the control mechanism 30 through a cable 45. This data sets the duty cycle at which the valve 44 will operate. As is well known with pwm valves, the output pressure is proportional to the duty cycle such that the output pressure is a percentage of the input pressure. Since the pwm valve is a pilot for the signal valve 42, the output pressure of the signal valve 42 will be a percentage of the input pressure. An inlet port 47 on the signal valve 42 and, therefore, pwm valve 44 communicate with the control mechanism 30 for input hydraulic fluid through a line passage 46. The line passage 46 also conducts pressurized hydraulic fluid to the control valve 38 and the shuttle valve 40. The pressure level in the line passage 46 is the highest pressure in the hydraulic system. As is well known, the line pressure is generated by a regulator valve, not shown, which has a bias pressure proportional to the input torque. Thus, the pressure level in the line passage 46 is proportional to the transmission input torque.

The signal valve 42 communicates with the a port 49 on the control valve 38 through a signal passage 48. The hydraulic pressure in the signal passage 48 is a percentage of the pressure in the line passage 46 as determined by the pwm valve 44. The control valve 38 communicates with a control passage 50 which is connected with a control port 52 on valve 38, a control port 54 on the shuttle valve 40 and an inlet port 56 on the shuttle valve 40. The line passage 46 is in fluid communication with an inlet port 58 on the control valve 38 and an inlet port 60 on the shuttle valve 40 and a control port 62 on the shuttle valve 40. An outlet port 64 on the shuttle valve 40 is in fluid communication with the clutch apply passage 38. Thus, the outlet pressure from the shuttle valve 40 is directed to the clutch 20. The control valve 38 and signal valve 42 have exhaust ports 66 and 68, respectively. The control valve 38 has a bias spring 70 which connects an outlet port 72 and therefore passage 50 with the exhaust port 66.

The shuttle valve has two inlet ports 56 and 60 and one outlet port 64 which communicates with the clutch 20. Thus, the clutch 20 can be selectively pressurized and engaged from pressurized fluid in either passage 50 or passage 46. The pressure in passage 46 is equal to line pressure which is the highest pressure in the control system 26. The pressure in the control passage 50 is established by the control valve 38 and influenced by the pressure in the signal passage 48 which is determined by the signal valve 42.

The pwm solenoid valve receives an electrical signal, proportional to various operating parameters, such as engine throttle, from the control mechanism 30 to establish the duty cycle commanded. As is well known in transmission controls, the pressure in the line passage 46 is proportional to the input torque of the transmission. Since the output pressure of the signal valve 42 is a percentage of the input pressure, depending on the duty cycle, the signal pressure in the passage 48 operating on the control valve 38 is also proportional to the transmission input torque. Since the pressure in the passage 48 is a percentage of the pressure in the passage 46, the signal pressure in passage 48 will fluctuate, while retaining the commanded percentage, with line pressure to reflect changes in the input torque.

The area of the valve 38 which is open to the port 49 is preferably smaller than the area of the valve 38 which is open to the port 52. With this design feature, the pressure in the control passage 50 will be proportional to but less than the pressure in the signal passage 48. This area differential will set the gain of the valve 38 to less than one, which will aid in reducing the hydraulic noise normally associated with pwm solenoids. The gain of less than one will also reduce the effects that signal pressure change in the passage 48 has on the control pressure in the control passage 50.

The area of the shuttle valve 40 open to the port 62 is less than the area open to the port 54. The ratio of these areas will determine when the shuttle valve 40 directs line pressure in passage 46 to the clutch 20 and when the shuttle valve 40 directs control pressure in passage 50 to the clutch 20. The area ratio on the shuttle valve 40 can be designed such that the shuttle valve will only shift to direct full line pressure to the clutch 20 when the clutch 20 has been engaged beyond the critical capacity for a given input torque.

When the vehicle is sitting at a stop in an engine idle condition with the vehicle brakes applied, the input torque to the transmission is very low. The pwm solenoid valve 44 is operated at a high duty cycle and the output signal pressure of the signal valve 42 is low such that the control pressure in passage 50 is at a small percentage of the pressure in the line passage 46. This permits the shuttle valve 40 to be positioned by the line pressure in passage 46 such that the control pressure in passage 50 is directed to the clutch 20 through the passage 28. The clutch engagement pressure will be at a very low value that is sufficient to maintain the apply chamber of the clutch 20 filled but insufficient to cause significant engagement of the clutch. Thus, the transmission will be in a neutral idle condition and the torque converter is operated with minimum slip, which results in maximum efficiency.

As the operator releases the brake and advances the engine throttle, the input torque will increase and the duty cycle of the pwm solenoid valve 44 will decrease. This will result in an increase in the control pressure in the passage 50 such that the clutch 20 will be engaged. When the control pressure in the passage 50 has exceeded the predetermined percentage of the line pressure, the shuttle valve 40 will be repositioned to direct full line pressure to the clutch 20. As mentioned above, the repositioning of the shuttle valve 40 will occur only after the clutch 20 has been engaged sufficiently greater than its critical capacity.

Figure 2A:
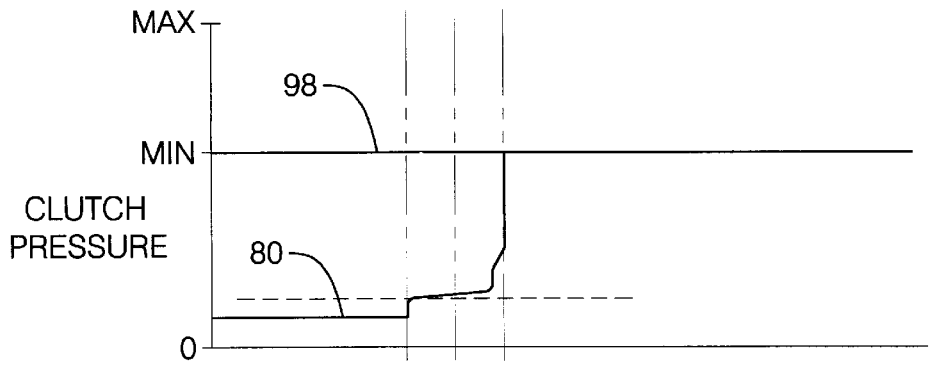
FIGS. 2A, 2B, 2C, 2D, and 2E are curves representing operating and control parameters used in the operation of a transmission control incorporating the present invention at low throttle conditions.
Figure 2B:
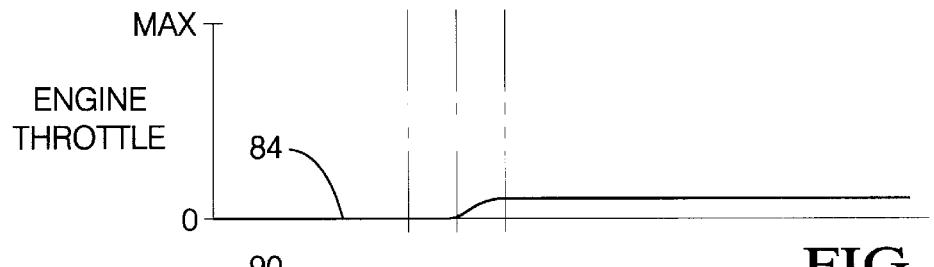
Figure 2C:
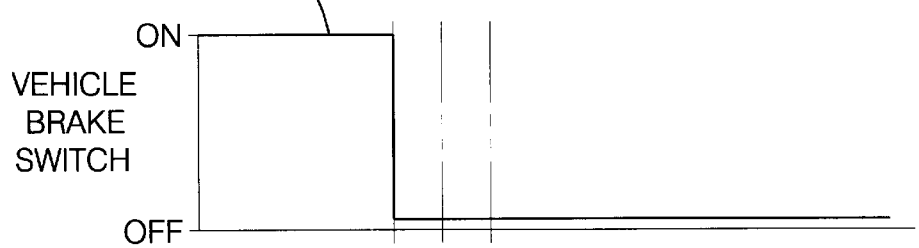
Figure 2D:
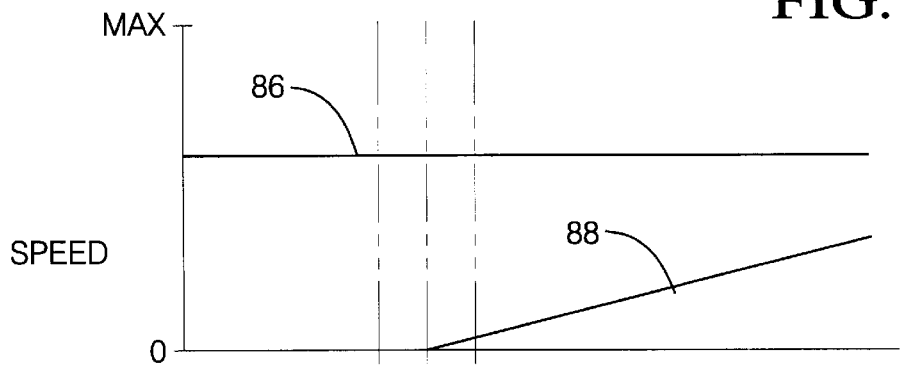
Figure 2E:
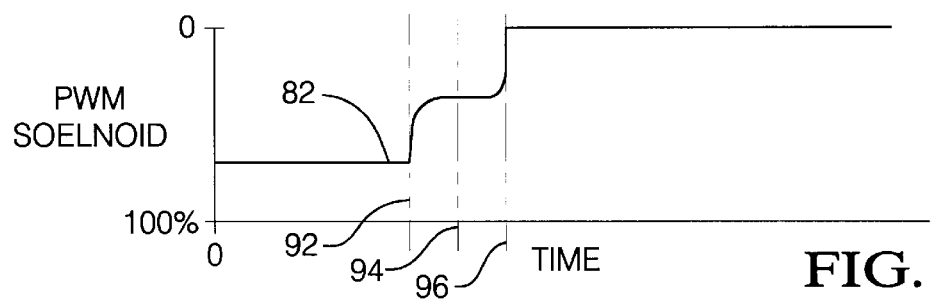
Figure 3:
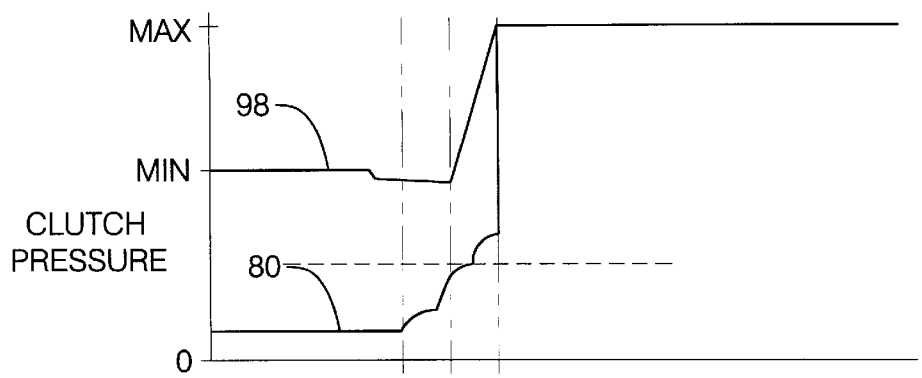
FIGS. 3A, 3B, 3C, 3D, and 3E are curves representing the same parameters as shown in FIG. 2 when the system is operating at a mid throttle condition.
Figure 3:
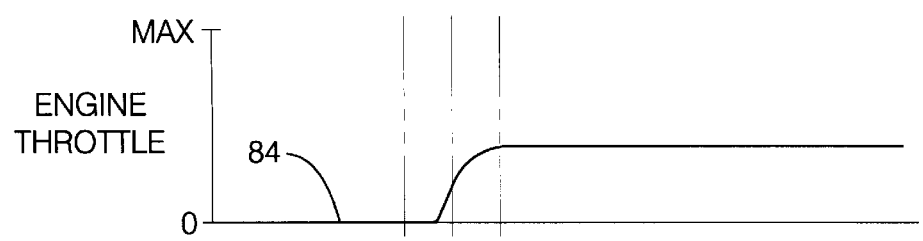
Figure 3:
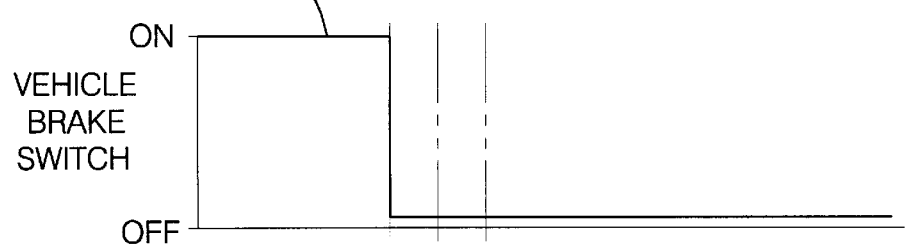
Figure 3:
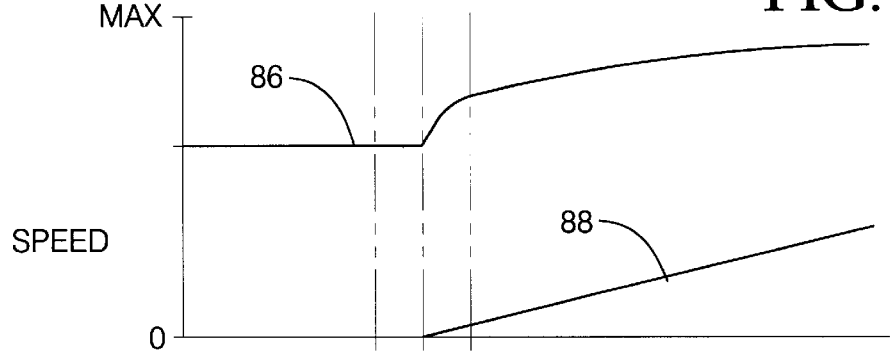
Figure 3:
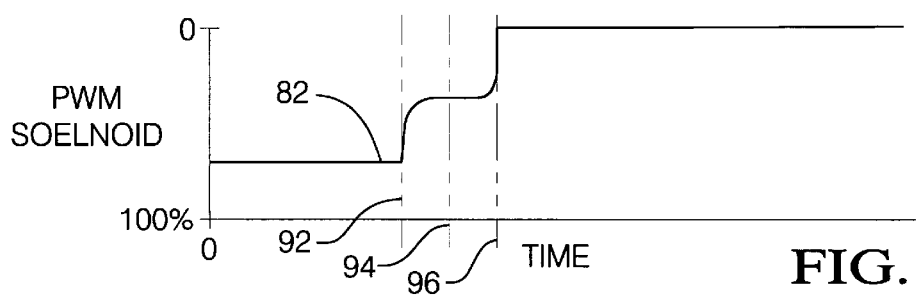

FIGS. 2A, 2B, 2C, 2D and 2E represent a low throttle apply condition following a neutral idle condition. The clutch apply pressure, represented by line 80 in FIG. 2A, is low and the pwm duty cycle, line 82 in FIG. 2E, is high; the engine throttle, line 84 in FIG. 2B, and the engine speed, line 86 in FIG. 2D, are at an idle condition; the vehicle speed, line 88 in FIG. 2D, is zero and the vehicle brakes, line 90 in FIG. 2C, are applied when the time is at zero.

At some time, the brake is released at line 92 and the throttle is advanced to a low throttle vehicle launch condition at line 94. The duty cycle of the pwm solenoid decreased as the brake is released and the clutch pressure is increased. The clutch pressure reaches critical capacity at line 94. As the throttle and duty cycle are increased and decreased, the clutch pressure also increases until the shuttle valve 40 is shifted at line 96. After the shuttle valve 40 is shifted, the clutch pressure is equal to line pressure represented by line 98 in FIG. 2A.

The curves shown in FIGS. 3A, 3B, 3C, 3D and 3E represent a mid-throttle vehicle launch. The line designations are the same as those used in FIGS. 2A through 2E. While the pnvm duty cycle curves, lines 82 are quite similar, the clutch pressure curves, lines 80, and the critical capacity, lines 94, are significantly different. This is primarily because the line pressure in passage 46 increases with throttle increase, and the control pressure in passage 50 and the signal pressure in passage 48 are a percentage of line pressure as determined by the duty cycle of the pwm solenoid 44. Thus, as line pressure increases, the signal and control pressures will also increase for a given duty cycle. Since the critical capacity is a function of the torque transmitted, the critical capacity increases as input torque increases.

By way of example, at a low throttle low torque condition, the line pressure is 65 psi, and the duty cycle of the pwm solenoid is 70. This will support vehicle launch with a clutch apply pressure of approximately 10 psi. The critical capacity of the clutch is reached at a duty cycle of 40 and the clutch apply pressure is approximately 21 psi. This pressure will support the torque transmitted by the clutch 20 at this input torque level.

At a mid-throttle mid-torque condition, the line pressure is 125 psi and the duty cycle is again 70 at vehicle launch. The clutch pressure will be approximately 23 psi. This higher clutch pressure is needed to support the torque being transmitted. The critical capacity is reached at a duty cycle of 40 but the clutch apply pressure is approximately 44 psi. Again, the higher apply pressure is required to transmit the higher torque level.

What is claimed is:

1. A transmission control for a selectively engageable torque transmitting apparatus in a power transmission, said control comprising:

an electro-hydraulic control means for supplying pressurized fluid at a first pressure level and control signals;

a signal valve means for providing a signal pressure at a value proportional to an electronic control signal;

a control valve mechanism responsive to said signal pressure for providing a control pressure fluid at a second pressure level proportional to and less than said first pressure level;

a shuttle valve mechanism responsive to said control pressure fluid and said supplied pressurized fluid for directing said control pressure fluid to the torque transmitting apparatus when said second pressure level is less than a predetermined percentage of said first pressure level and for directing said pressurized fluid at said first pressure level when said predetermined percentage is exceeded.

2. A transmission control in a power transmission for a selectively engageable fluid-operated torque transmitting clutch having a critical capacity determined by the amount of torque being transmitted, said control comprising:

an electro-hydraulic control means for supplying pressurized fluid at a first pressure level and duty cycle control signals;

a signal valve means for providing a signal pressure at a value proportional to said duty cycle control signal;

a control valve mechanism responsive to said signal pressure for providing a control pressure fluid at a second pressure level proportional to and less than said first pressure level;

a shuttle valve mechanism responsive to said control pressure fluid and said supplied pressurized fluid for directing said control pressure fluid to the torque transmitting apparatus when said second pressure level is less than a predetermined percentage of said first pressure level and for directing said pressurized fluid at said first pressure level when said predetermined percentage and the critical capacity of the clutch are exceeded.

* * * * *